(12) United States Patent
Raj et al.

(10) Patent No.: US 11,582,221 B1
(45) Date of Patent: Feb. 14, 2023

(54) SECURING ENCRYPTED VOLUMES IN A DISTRIBUTED ENVIRONMENT

(71) Applicant: Amazon Technologies, Inc., Seattle, WA (US)

(72) Inventors: Rohit Raj, Seattle, WA (US); Rachit Jain, Bothell, WA (US); Dan Popick, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 16/582,708

(22) Filed: Sep. 25, 2019

(51) Int. Cl.
*H04L 29/06* (2006.01)
*H04L 9/40* (2022.01)
*H04L 9/00* (2022.01)
*H04L 9/08* (2006.01)
*H04L 9/32* (2006.01)

(52) U.S. Cl.
CPC .......... *H04L 63/0823* (2013.01); *H04L 9/006* (2013.01); *H04L 9/085* (2013.01); *H04L 9/3263* (2013.01)

(58) Field of Classification Search
None
See application file for complete search history.

(56) References Cited

U.S. PATENT DOCUMENTS

| | | | | |
|---|---|---|---|---|
| 9,064,127 | B2 * | 6/2015 | O'Hare | H04L 9/0897 |
| 9,455,968 | B1 * | 9/2016 | Machani | G06Q 20/3821 |
| 9,516,002 | B2 * | 12/2016 | O'Hare | H04L 12/4641 |
| 2013/0268774 | A1 * | 10/2013 | O'Hare | G06F 9/455 |
| | | | | 713/189 |
| 2017/0034192 | A1 * | 2/2017 | Schulman | G06N 20/00 |
| 2021/0058379 | A1 * | 2/2021 | Bursell | H04L 9/14 |

* cited by examiner

*Primary Examiner* — Wasika Nipa
*Assistant Examiner* — Mayasa A. Shaawat
(74) *Attorney, Agent, or Firm* — Davis Wright Tremaine LLP

(57) ABSTRACT

The present disclosure relates to generating a passphrase for an encrypted volume by at least cryptographically combing the first cryptographic key and the shared secret. Where the shared secret is split into a plurality of shares and a first number of the plurality of shares is greater than a second number of the plurality of shares and the second number of the plurality of shares is required to reconstruct the shared secret.

20 Claims, 8 Drawing Sheets

SECURING ENCRYPTED VOLUMES IN A DISTRIBUTED ENVIRONMENT

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, have increased the importance of controlling access to data stored and manipulated thereon. As systems scale to meet demand, they tend to become more widely distributed, and controlling the distribution of data so as to prevent unwanted or unauthorized parties from accessing such data becomes more complex.

BRIEF DESCRIPTION OF THE DRAWINGS

Various techniques will be described with reference to the drawings, in which.

DETAILED DESCRIPTION

Figure 1:
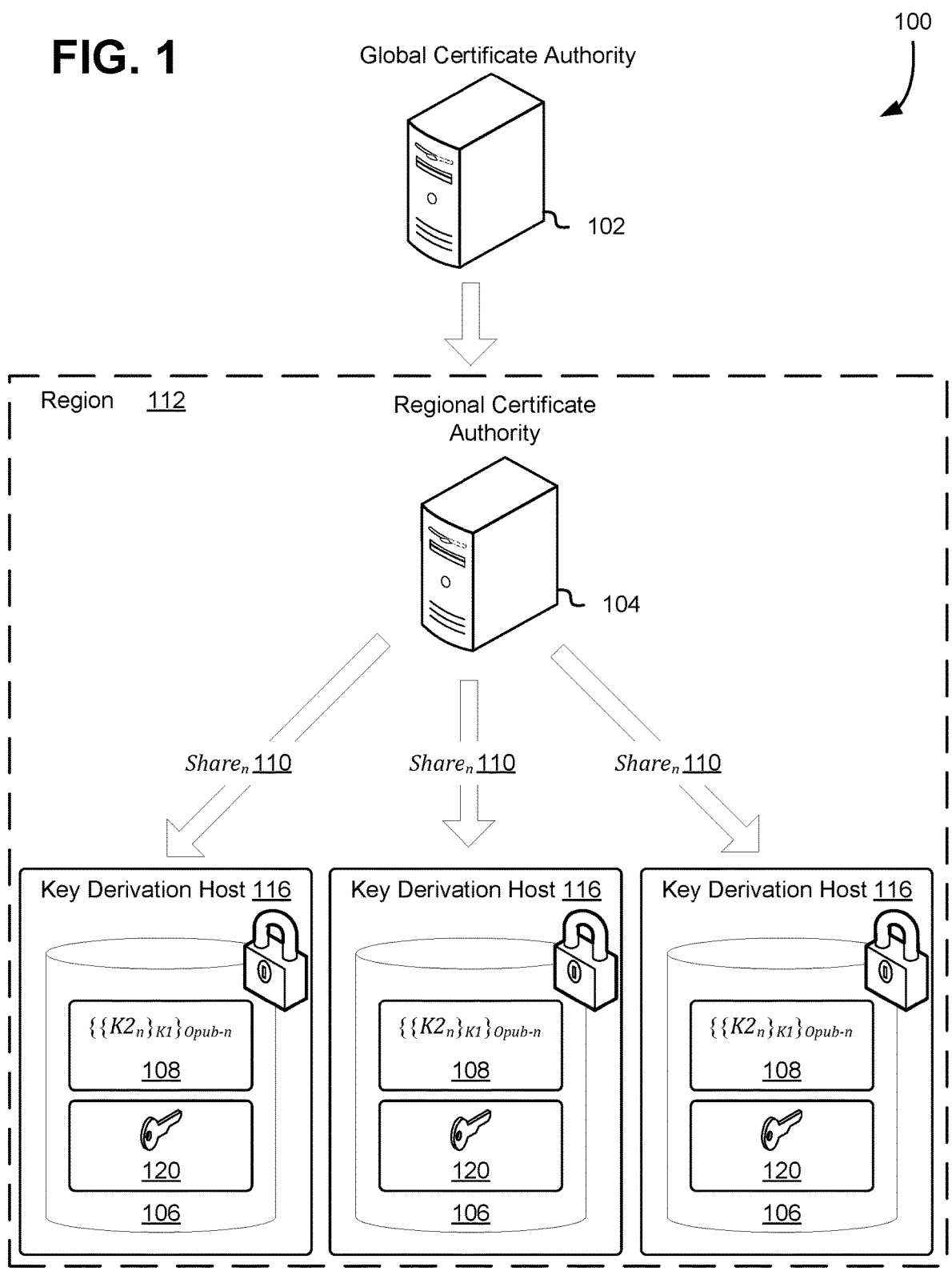
FIG. 1 shows an illustrative example environment between a global certificate authority, a regional certificate authority, a set of key derivation hosts for providing secure management of sensitive information.

Techniques described and suggested herein include systems, methods, and processes for secure management and utilization of sensitive information including cryptographic keys for use by a set of heterogeneous clients. This is ensured, at least in part, by generating a plurality of secure hosts (referred to as key derivation hosts) which maintain sensitive information on an encrypted volume (e.g., a hard disk) where the passphrase for the encrypted volume is generated using a secret sharing algorithm or otherwise divided into a number of shares for distribution among the plurality of secure hosts. In various examples described in greater detail below, when creating a new region (e.g., a group of key derivations) a passphrase is created and split into N shares using a secret sharing algorithm (e.g., Shamir's Secret Sharing algorithm) where k shares are necessary to reconstruct the passphrase or other information useable to recreate the passphrase. Furthermore, the passphrase, in various examples, is used to decrypt a master key that is created to encrypt a volume or other logical partition.

The key derivation hosts may maintain sensitive information such as a cryptographic key on an attached volume (e.g., a logical or physical volume assigned to the key derivation host) for increased availability and lower latency when processing requests for various clients. In one example, the key derivation hosts encrypt sensitive data and generate secure tokens for us by the various clients, which may include other computer systems. To ensure that a potential attacker is unable to access the sensitive information the attached volume is encrypted (e.g., using Linux Unified Key Setup (LUKS)). In addition to encrypting the attached volume, the passphrase required to perform operations on the attached volume may be a composite key for increased security. In such examples, a key derivation host generates a plaintext key ($K_1$) stored in memory that is combined with a share ($K_2$) of a shared secret that is split into N shares as described in greater detail below. The passphrase may then be generated or recreated using $K_1$ and $K_2$. During creating of a new region, the first key derivation host in the region generates a shared secret ($K_M$) which is split into N shares.

For subsequent bootstrapping and/or addition of key derivation hosts to the region, in various examples, the key derivation hosts obtains a copy of the encrypted volume along with $K_1$ and k encrypted shares of $K_2$. As described in greater detail below, the encrypted shares of $K_2$ may be encrypted using the public key of the new key derivation host. In such examples, new key derivation hosts provide certificate signing requests to a certificate authority. Once the new key derivation host has obtained access to the encrypted volume using K1 and K2, the new key derivation host may generate a new K1 and K2 and destroy the previous K1 and K2. In addition, the key derivation hosts may be walled off or otherwise protected from attackers or other access that may expose the sensitive information maintained in the encrypted volumes. For example, access to the key derivation host may be block by disabling Secure Shell (SSH) or other communication protocols. Finally, in some examples, when a connection to the key derivation host is established, the key derivation host may delete or otherwise destroy all cryptographic keys (e.g., K1 and K2) and unmount the encrypted volume.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 including a global certificate authority 102, a regional certificate authority 104, and a set of key derivation hosts 116 within a region 112. The global certificate authority 102 may include one or more computer systems that provide a central root of trust. For example, the global certificate authority 102 authenticates computer systems for various operations described in the present discloser such as creation of the key derivation hosts 116. The global certificate authority 102 may include various computer systems capable of implementing a public key infrastructure (PKI). In one example, the global certificate authority 102 is a server computer system assigned a digital certificate and user to manage public-key encryption for a set of regions. In various embodiments, the set of regions include the region 112. The region 112, in various examples, is a logical and/or physical grouping of key derivation hosts 116. In one example, the region 112 includes 4 key derivations hosts 116 organized into a group and that share sensitive information 120 stored in an encrypted volume 106 described in greater detail below. The region 112 (e.g., the key derivation hosts 116 assigned to the region 112) may contain a discrete geographical area or may be distributed between a plurality of different geographic areas.

The key derivation hosts 116 assigned to the region 112, in various embodiments, include the encrypted volume 106 which contains the sensitive information 120 used by clients of the key derivation hosts described in greater detail below in connection with FIG. 2. The sensitive information 120, in one example, includes a set of cryptographic keys used by the client to encrypt data or perform other operations including a cryptographic key of the set of cryptographic keys. In addition, the key derivation hosts 116 may include a passphrase 108, which may be used to perform various operations with the encrypted volume 106, such as input and output (I/O) operations on the encrypted volume 106. In some embodiments, the passphrase 108 is used to recreate a master key associated with the encrypted volume 106 in order to perform the various operations described above. In one embodiment, the encrypted volume 106 is encrypted using the LUKS. In this embodiment, the master key used to decrypt the encrypted volume 106 is encrypted with the passphrase 108 and the key derivation hosts 116 may decrypt the master key using the passphrase 108 in order to access the encrypted volume 106 and perform I/O operations.

The global certificate authority 102, in various embodiments, is assigned a pair of cryptographic key (e.g., public/private key pair) used for encryption of regional backups, validation, authentication, and other encryption operations. Furthermore, the region 112 contains the regional certificate authority 104 created at least in part by generating a certificate signing request which is validated (e.g., signed) by the global certificate authority 102. Validation of the regional certificate authority 102 establishes a private key associated with the region 112 for use by the key derivation hosts 116 within the region 112. In addition, the public key associated with the private key for the region 112 may be made available by the global certificate authority 102 to other computer systems. Furthermore, the regional certificate authority 104 may use the private key associated with the region 112 to prove the origination from the region 112.

In various embodiments, the key derivation hosts 116 may periodically or aperiodically backup or otherwise store the encrypted volumes 106 in various suitable storage locations such as a cloud storage service. Furthermore, in such embodiments, a master key for decrypting the encrypted volume 106 is encrypted with the public key of the global certificate authority or otherwise maintained in a secure state for use when restoring backups of the encrypted volume. As described in greater detail below, the key derivation hosts 116 may also maintain a whitelist of other information indicating other key derivation hosts 116 in the region and/or approved clients for responding to requests. As described in greater detail below in connection with FIGS. 3 and 4, when the region 112 is created a key derivation host 116 is created and assigned as the regional certificate authority 104 for the region 112. As illustrated in FIG. 1, the key derivation hosts 116 (e.g., the key derivation host 116 of the region 112 operating as the regional certificate authority) may be responsible for distribution shares of the shared secret (Share$_n$) 110. For example, as new key distribution hosts 116 are added to the region 112, existing key distribution hosts 116 are responsible for providing shares of the shared secret (Share$_n$) 110 to the new key distribution hosts 116 so that the new key distribution hosts 116 can obtain the passphrase 108 in order to perform I/O operations with the encrypted volumes 106 attached to the new key distribution hosts 116.

In addition, when the region 112 is created the first key derivation host 116 in the region 112 may be responsible for generating the shared secret and distributing the shares of the shared secret (Share$_n$) 110. In the various embodiments described in the present disclosure, the shared secret may be generated using any suitable secret sharing algorithm such as Shamir's Secret Sharing algorithm, Blakley's algorithm, or the Chinese remainder algorithm. In one example, the passphrase 108 shared, by using the Shamir's Secret Sharing to generate a shared secret, such that a quorum quantity of shares of the shared secret can be used to reconstruct the shared secret (e.g., the passphrase 108). Furthermore, an encryption key may be used to encrypt the shares of the shared secret (Share$_n$) 110. For example, a share of the shared secret (Share$_n$) 110 is encrypted with the public key corresponding to the private key of a particular key derivation host 116 designated to receive the share of the shared secret (Share$_n$) 110. Encrypting the shares of the shared secret (Share$_n$) 110 in this manner, ensure that only the new derivation host 116 intended to use the shares of the shared secret (Share$_n$) 110 to reconstruct the passphrase 108 is capable of decrypting the encrypted shares of the shared secret (Share$_d$) 110. As illustrated in FIG. 1, the passphrase is represented by $\{\{K2_n\}K1\}_{Opub-n}$ which is a composite generated using a shared secret K2 and encrypted with the public key of the key distribution host 116 (where n represents the particular key derivation host 116 that is the intended recipient). The shared secret K2 is generated using K shares (where K is the minimum number of shares needed to reconstruct the shared secret and N is the total number of shares) of $K2_n$. Once the shared secret K2 is reconstructed, in order to generate the composite cryptographic key, K2 is combined with K1.

The minimum number of shares (K) needed to reconstruct the shared secret may be less than or equal to the number of shares of the shared secret (N). Furthermore, K and N may be determined based at least in part on a variety of different factors. For example, if high availability is desired, the number of shares (K) needed to reconstruct the shared secret may be set to a small percentage (e.g., 45%) of the told number of available key derivation hosts 116. In another example, if higher security is desired and/or the risk of a host being compromised is to be mitigated, the number of shares (K) needed to reconstruct the shared secret may be set to a large percentage (e.g., 95%) of the told number of available key derivation hosts 116. In addition, the values of K and N may be modified at any point during execution of the key derivation hosts 116. In some examples, as key derivation hosts 116 are added or removed from the region 112 the values of K and N are modified.

In addition to determining and/or modifying the number of shares of the shared secret (N) and/or the minimum number of shares (K) needed to reconstruct the shared secret, regional certificate authority 104 or other entity distributing the various shares of the shared secret (illustrated in FIG. 1 as (Share$_n$) 110), in various embodiments, encrypts the Shares$_n$ 110 using various encryption techniques. Returning to the examples above, K2 is cryptographically wrapped with K1, which is then split to generate the N shares of the shared secret and each share (Share$_n$ 110) is encrypted with a cryptographic key associated with the key derivation host 116 receiving the Share$_n$ 110 (e.g., with the key derivation host's 116 public key). In various embodiments, cryptographically wrapping data (e.g., a cryptographic key) includes using an encryption algorithm such as symmetric encryption algorithms to encapsulate (e.g., encrypt) the data with cryptographic key material. Returning to the example above, cryptographically wrapping K2 with K1 includes using a symmetric encryption algorithm to encrypted K2 with K1. In another example, K2 may be split into N shares and then each share is cryptographically wrapped with K1. Similarly, the individual shares (e.g., Share$_n$ 110) wrapped with K1 may be encrypted with the cryptographic key associated with the key derivation host 116 receiving the Share$_n$ 110 (e.g., with the key derivation host's 116 public key).

Other encryption techniques can be used for securing the Share$_n$ 110 during distribution to the key derivation hosts 116. For example, a symmetric encryption key K3 is stored on the key derivation hosts 116 and used to cryptographically wrap K2 to avoid over exposure of K1. In yet another example, K1 and K3 may be combined to derive a wrapping key used to cryptographically wrap the shares of K2. In these examples, K1 and K3 may be combined using hash-based message authentication code (HMAC) or other key derivation algorithm. Other key derivation functions such as Password Based Key Derivation Function 2, Ballon Hashing, Simple Key Derivation Function, Scrypt, or any other algorithm from which cryptographic material can be generated from and input may be used in connection with the present disclosure. Furthermore, the shares of K2, in various embodiments, are cryptographically wrapped using various encryption algorithms such as Advanced Encryption Standard (AES), Secure Hash Algorithm (SHA), Data Encryption Standard (DES), or similar algorithms. In some embodiments, the encryption algorithms utilize an initialization vector (IV) which may be fixed or a separated IV for each share may be stored locally in each key derivation host 116 or incorporated in to each Share$_n$ 110 of K2.

Figure 2:
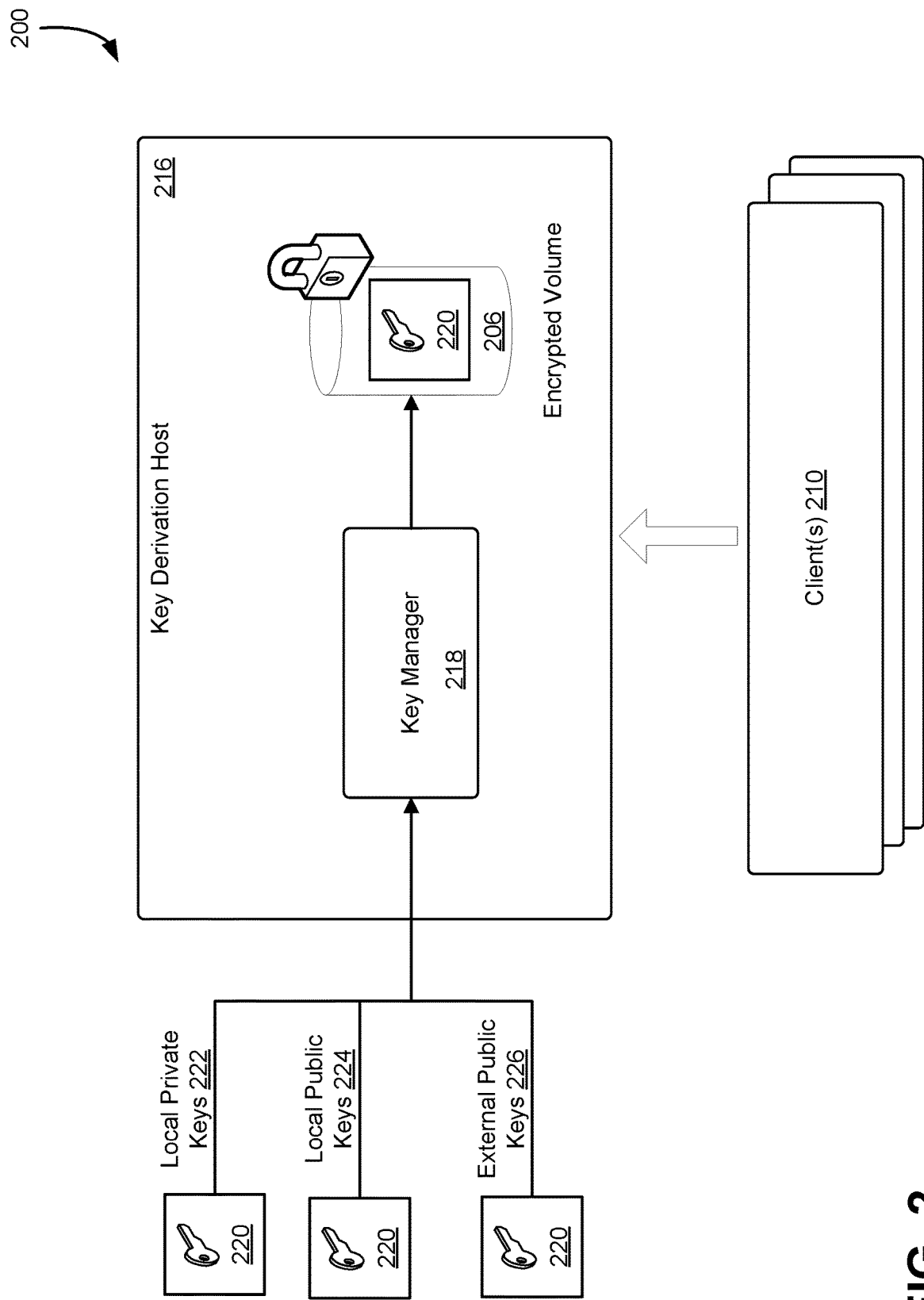
FIG. 2 shows an illustrative example environment between a set of clients and a key derivation host for providing secure access and utilization of sensitive information.

FIG. 2 illustrates an example environment 200 including a key derivation host 216 that protects sensitive information 220 including cryptographic material in an encrypted volume 206 for use in processing requests from one or more client(s) 210. As illustrated in FIG. 2, the key derivation host 216 executed a key manager 218 which periodically or aperiodically polls the encrypted volume 206 to determine if the sensitive information 220 has expired or is missing. The client(s) 210 include, in various embodiments, a plurality of services of a computing resource service provider. In addition, the plurality of services may utilize the key derivation host 216 to generate tokens using sensitive information 220, encrypt data using cryptographic key included in the sensitive information 220, or other operations described in the present disclosure.

The sensitive information, as illustrated in FIG. 2, includes local private key 222, local public key 224, and external public key 226. Although local private key 222, local public key 224, and external public key 226 are illustrated in FIG. 2, any sensitive information 220 or other information to be protected may be stored in the encrypted volume 206. As described in the present disclosure, storing the sensitive information 220 in the encrypted volume 206 allows data to be persisted locally so that the key derivation host 216 can perform operations on behalf of the client(s) 210 without accessing an external data store. In addition, if the key derivation host 216 fails or is unresponsive for an extended interval of time, the encrypted volume can be backed up or otherwise packaged and distributed to other key derivation hosts.

Returning to the key manager 218, in an embodiment, at the expiration of an interval of time (e.g., 15 minutes), the key manager 218 updates the contents the encrypted volume (e.g., adding, deleting, or removing sensitive information 220). Furthermore in some embodiments, the key manager 218 is responsible for maintaining the passphrase and other information (e.g., K1 and K2) for encrypting, decrypting, and performing I/O operations associated with the encrypted volume 206. For example, the key manager 218 maintains the primary passphrase from the encrypted volume which as described above is derived from a plaintext secret stored on the key derivation host 216 (K1) (e.g., a randomly or pseudorandomly generated value) and a secondary secret that is partitioned into a plurality of shares (K2). In this manner, if an attacker compromises the key derivation host 216, the key derivation host is unable to derive or otherwise recreate the passphrase to interact with the sensitive information 220.

In some embodiments, while the K1 is available on the key derivation host 216 outside of the encrypted volume 206 (e.g., K1 is stored in memory of the key derivation host 216), the K2 component of the passphrase is encoded such that it can only be reconstructed by K of N other key derivation hosts registered in the region (e.g., by collecting K shares of N from K other key derivations hosts in the region). As described in the present disclosure, this is accomplished by, in various embodiments, partitioning K2 into N parts using Shamir's Secret Sharing algorithm and then encrypting each share with both K1 and a key derivation host-specific public key.

As a result, reconstituting the passphrase can be accomplished by K of N key derivation hosts in the region interacting with the key derivation host 216 to reassemble K2, combine it with K1, and derive the passphrase. In some embodiments, to increase security, both K2 and the derived passphrase are not stored in the encrypted volume 206. In these embodiments, if the key derivation host 216 fails, is restarted, or otherwise loses K2 or the derived passphrase, K2 must be recovered and a new K1 and K2 are generated, for example, using the process illustrated in FIG. 6 of the present disclosure. Therefore, in the examples illustrated in FIG. 2 and various other embodiments described in the present disclosure, a potential attacker requires the contents of the key derivation host 216 and the cooperation of K other key derivation host in a region in order to access the encrypted volume 206.

In an embodiment, the key manager 218 and/or key derivation host 216 adds a second passphrase or second cryptographic key associated with the encrypted volume 206 to enable recovery of the encrypted volume 206. In one example a symmetric key (K3) is generated and encrypted with a global certificate authority's public key and retained on in the memory of the key derivation host 216. The encrypted symmetric key (K3) and/or a copy of the encrypted volume 206 may be stored in a cloud computing service, external data store, or other location for retrieval in case of recovery. For example, the key manager 218 transmits the copy of the encrypted volume 206 to an external data store for storage with the symmetric key (K3) (e.g., encrypted with the global certificate authority's public key) attached to the copy of the encrypted volume 206 as metadata. In such examples, the copy of the encrypted volume 206 can only be decrypted by the key derivation host that generated the copy or an entity with access to the global certificate authority's private encryption key. In addition, as described in greater detail below, the key manager 218 maintains a whitelist of key derivation hosts in the region and/or approved client(s) 210.

Figure 3:
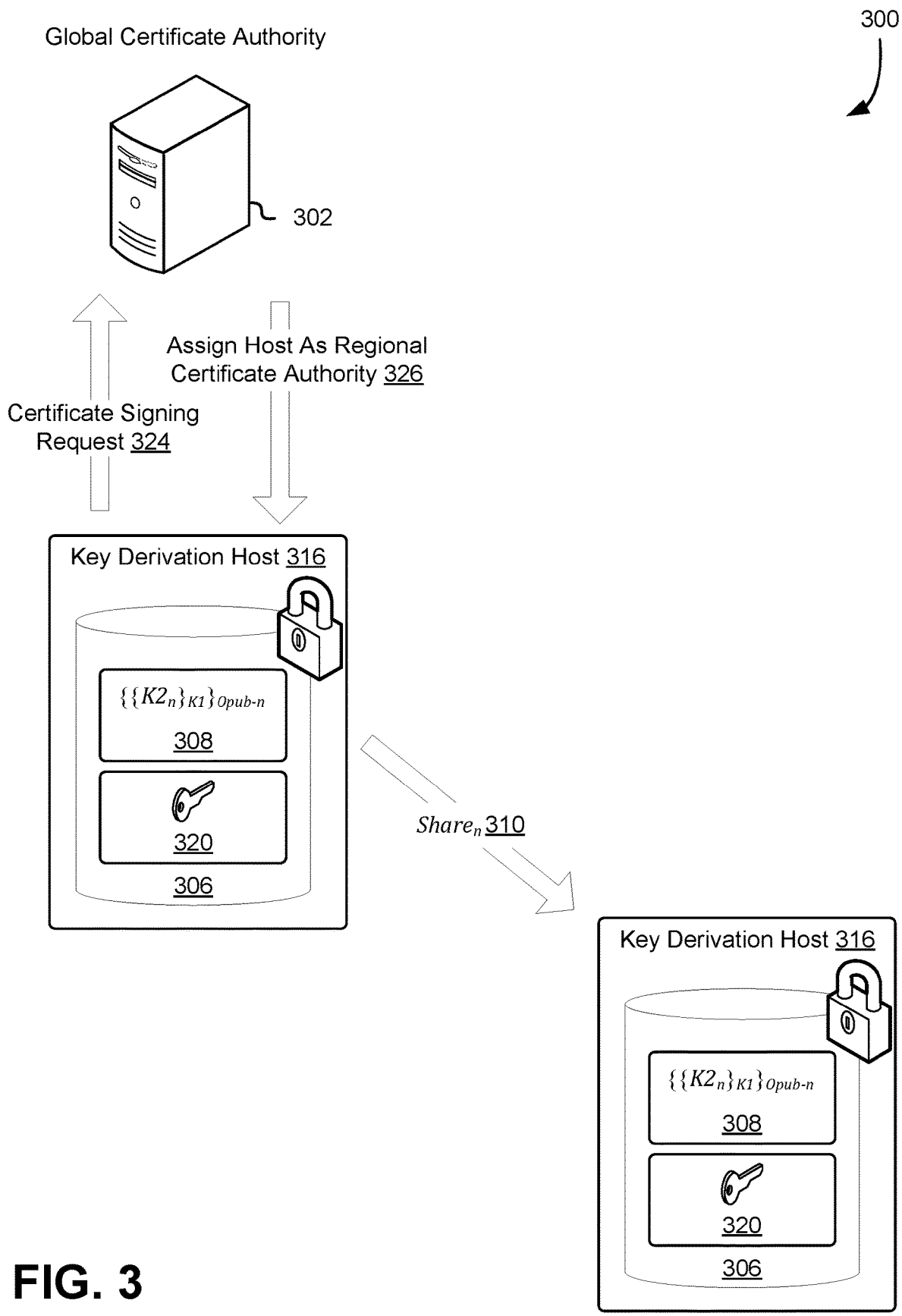
FIG. 3 shows an illustrative example environment for creating a new region and securely managing sensitive information.

FIG. 3 illustrates an example environment 300 including a global certificate authority 302 that assigns a key derivation host 316 as a regional certificate authority 326 responsible to setting up new key derivation hosts 316 in a region. The global certificate authority 302, as described above, may include a computer system assigned a digital certificate and established as a root of trust for one or more regions described in the present disclosure. In various embodiments, the global certificate authority 302 is set up by a service of a computing resource service provider through a management console or other user interface. In yet other embodiments, an engineer or other operator installs or otherwise assigns the digital certificate to the global certificate authority 302 and established the trust relationship between the global certificate authority 302 and other computer systems and/or the one or more regions.

In addition, when generating a new region and/or other set of key derivation hosts 316, the global certificate authority 302 is responsible of digitally signing certificate requests (CSRs) 324 from the key derivation hosts 316. In various embodiments, the private key used by the global certificate authority 302 to digitally sign the CSRs 324 is maintained in memory or other storage of the global certificate authority 302. In other embodiments, the private key used by the global certificate authority 302 to digitally sign the CSRs 324 is maintained in an external storage location (e.g., a hardware security module). In such embodiments, external storage of the private key enables restoration of the private key in case of a failure of the global certificate authority 302.

As illustrated in FIG. 3, the first key derivation host 316 in a region generates the CSR 324 and provides the CSR 324 to the global certificate authority 302. The global certificate authority 302 then, in some embodiments, signs the CSR 324 and provides information to the first key derivation host 316 indicating that the first key derivation host 316 is assigned as the regional certificate authority 326. In various embodiments, the information includes the signed CSR 324. In yet other embodiments, the information includes simply an acknowledgement of receipt of the CSR or exposure of the public key included in the CSR 324. As a result of the global certificate authority 302 digitally signing the CSR 324, the public key included in the CSR 324 is associated with the first key derivation host 316.

As described in greater detail below in connection with FIG. 4, once the first key derivation host 316 determines assignment as the regional certificate authority, the first key derivation host 316, in various embodiments, obtains and/or generates an encrypted volume 306, sensitive information 320, and one or more passphrases 308 for accessing the encrypted volume 306. In one example, the one or more passphrases 308 include a global passphrase assigned to all encrypted volumes 306 in a region to allow for recovery of the encrypted volume 306 and each individual key derivation host 316 within the region has a local passphrase for accessing the encrypted volume 306 generated based at least in part on a local secret (e.g., cryptographic key and/or random value) and a shared secret shared with other key derivation hosts 316 within the region.

In various embodiments, once the first key derivation host 316 is set up in the region, the first key derivation host 316 generates a shared secret (K2), determines a of number of N parts to split K2 into, determines K shares of N required to reconstruct K2, and distributes the N shares of the shared secret (Share$_n$) 310 to one or more other key derivation hosts 316. As described above, in an embodiment, the values of K and N and the shares of the shared secret (Share$_n$) 310 are determined using Shamir's Secret Sharing algorithm.

Figure 4:
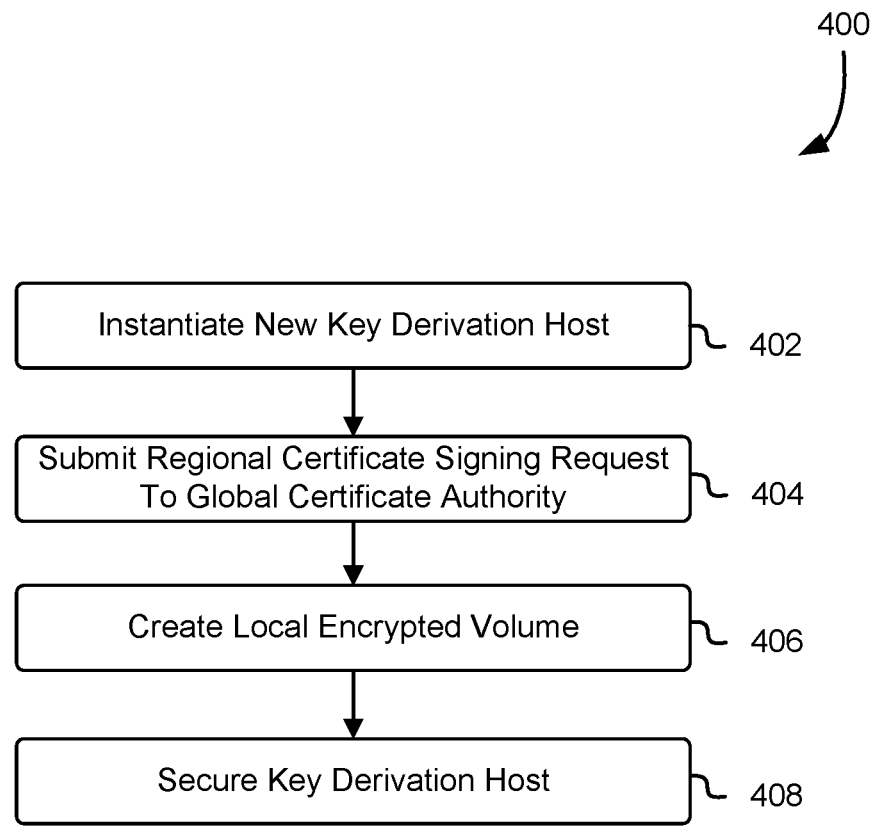
FIG. 4 shows an illustrative example of a process for creating a new region of key derivation hosts.

FIG. 4 is a block diagram illustrating an example of a process 400 for generating a new region to protect sensitive information and process requests to utilize the sensitive information on behalf one or more clients in accordance with at least one embodiment. Some or all of the process 400 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g,, a computer program persistently stored on magnetic, optical, or flash media).

For example, some or all of the process 400 may be performed by any suitable system, such as a server in a data center, by various components of the environment 100 described in conjunction with FIG. 1, such as the regional certificate authority 104 and/or key derivation host 116, by multiple computing devices in a distributed system of a computing resource service provider, or by a service provided by a computing resource service provider. The process 400 includes instantiating a new key derivation host 402. The key derivation hosts, as described above, may include physical computer system, virtual computer system, or combination thereof that excites instructions that cause the computer system to perform the operations described in the present disclosure. In addition, instantiation of the key derivation host, in some embodiments, is performed by one or more services of a computing resource service provider. For example, a virtual computing service instantiates a virtual machine and provides the virtual machine with executable instructions (e.g., source code) that, when implemented by the virtual machine, causes the virtual machine to execute the key derivation host.

In step 404, the key derivation host provides a regional certificate signing request (CSR) to a global certificate authority. As described above in connection with FIG. 3, the first key derivation host in a new region provides the regional CSR to the global certificate authority. In response, the global certificate authority, in various embodiments, assigns the first key derivation hosts as the regional certificate authority for the newly created region (e.g., the region the first key derivation host is assigned to). For example, the global certificate authority signs the regional CSI and publishes or otherwise provides the public key and/or other blessing information to establish the first key derivation host as the regional certificate authority for the region. Although, a CSR is described in the present embodiment, any mechanism for assigning a root of trust may be used in connection with establishing the regional certificate authority and/or the global certificate authority.

In step 406, the key derivation host creates the local encrypted volume attached to the key derivation host. In various embodiments, the encrypted volume is already created and the key derivation host simply obtains and/or updates the encrypted volume. As described above, creating the local encrypted volume may include a variety of operations including generating cryptographic keys, generating and/or modifying a whitelist of computer systems, and/or creating a backup of the encrypted volume. For example, the key derivation host may create both long-term and short-term asymmetric regional keys for distributing shared secrets, passphrases, symmetric keys, or other information between key derivation hosts within the region. In addition, the key derivation host, in some embodiments, encrypts the local volume with the LUKS encryption protocol.

In step, 410 the key derivation host is secured from potential attacks and/or operations that may compromise the sensitive information (e.g., data in the encrypted volume) and/or cryptographic material maintained by the key derivation host (e.g., passphrase, master key associated with the encrypted volume, regional certificate private key, etc. . . ). As described in greater detail below in connection with FIG. 7, the key derivation host executes source code or other executable code that, when executed by the key derivation host, implements a break glass response by the key derivation host. For example, when a network connection is established with the key derivation host, after the key derivation host is secured in step 410, the key derivation host may delete the encrypted volume and/or destroy the cryptographic material maintained in the memory of the key derivation host (e.g., K1 and K2 described above). Note that one or more of the operations performed in steps 402-412 may be performed in various orders and combinations, including in parallel. In numerous variations to the process 400, one or more of the operations in steps 402-412 may be omitted or performed by other systems or services.

Figure 5:
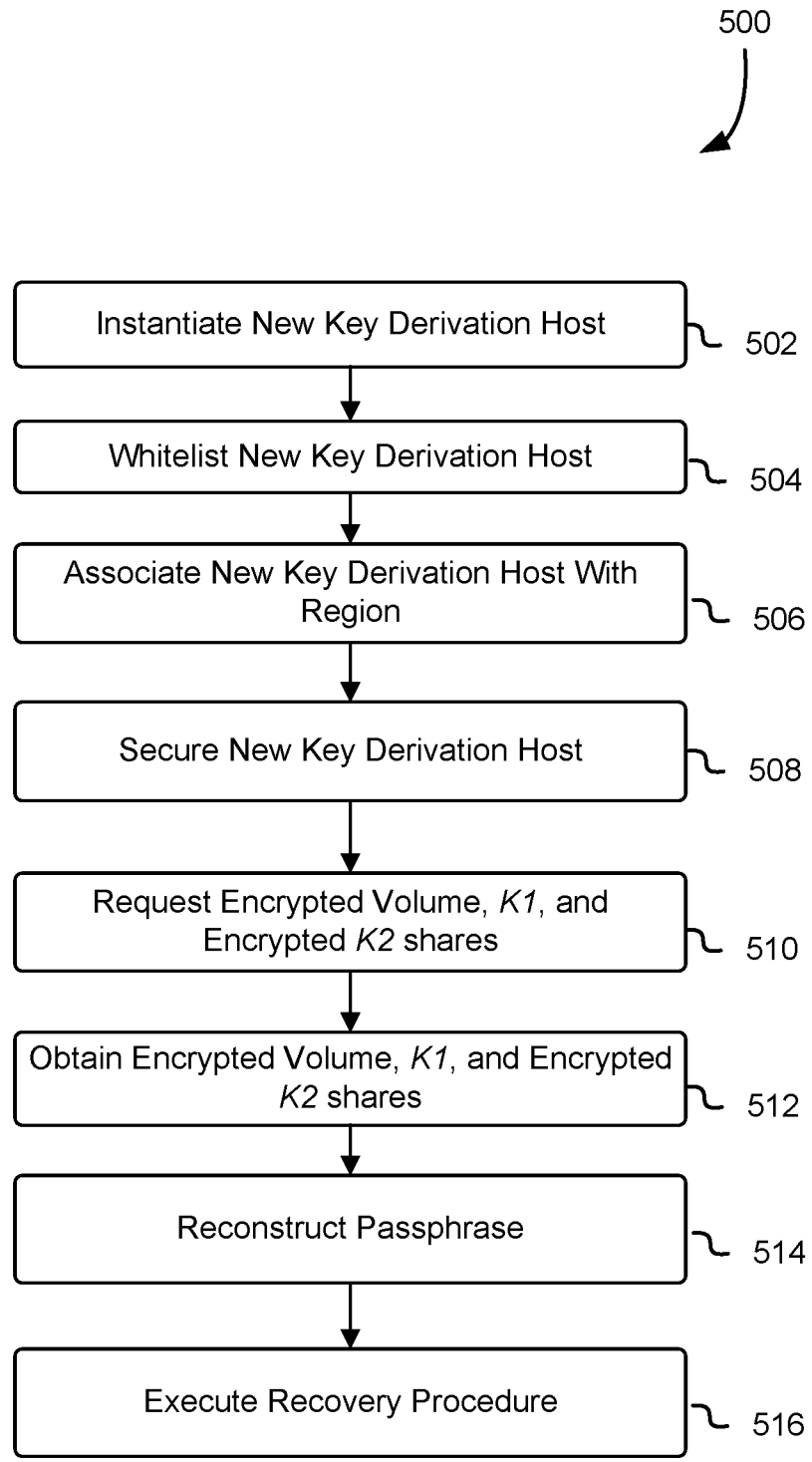
FIG. 5 shows an illustrative example of a process for adding a new key derivation host to a region.

FIG. 5 is a block diagram illustrating an example of a process 500 for adding a new key derivation host to a region in accordance with at least one embodiment. Some or all of the process 500 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 100 described in conjunction with FIG. 1, such as the key derivation host 316, by multiple computing devices in a distributed system of a computing resource service provider, or by a service provided by a computing resource service provider. The process 500 includes instantiating a new key derivation host 502. The key derivation hosts, as described above, may include physical computer system, virtual computer system, or combination thereof that excites instructions that cause the computer system to perform the operations described in the present disclosure. In addition, instantiation of the key derivation host, in some embodiments, is performed by one or more services of a computing resource service provider. For example, a virtual computing service instantiates a virtual machine and provides the virtual machine with executable instructions (e.g., source code) that, when implemented by the virtual machine, causes the virtual machine to execute the key derivation host.

In step 504, the new key derivation host is added to a whitelist of key derivation hosts in the region. In various embodiments, the whitelist includes a list of key derivation hosts included in the region and distributed to all the key derivation hosts in the region. In this manner, the key derivation hosts may validate requests from other key derivation hosts or otherwise determine that the key derivation host is authorized to obtain information associated with the region such as a share of the shared secret as described above. The whitelist, in some embodiments, is generated and/or maintained by the regional certificate authority and distributed to the key derivation hosts in the region. In yet other embodiments, engineers or other personnel add key derivation hosts to the whitelist and distribute the whitelist to the key derivation hosts in the region.

In step, 508 the new key derivation host is secured from potential attacks and/or operations that may compromise the sensitive information (e.g., data in the encrypted volume) and/or cryptographic material maintained by the new key derivation host (e.g., passphrase, master key associated with the encrypted volume, regional certificate private key, etc. . . ). As described in greater detail below in connection with FIG. 7, the new key derivation host executes source code or other executable code that, when executed by the key derivation host, implements a break glass response by the key derivation host. For example, when a network connection is established with the key derivation host, after the new key derivation host is secured in step 508, the new key derivation host may delete the encrypted volume and/or destroy the cryptographic material maintained in the memory of the new key derivation host (e.g., K1 and K2 described above).

In step 510, the new key derivation host acquires the encrypted volume, along with K1 and at least K encrypted shares of the shared secret K2. As described above, the encrypted volume, in various embodiments, is encrypted with a passphrase that is reconstructed using a first cryptographic key K1 generated by a key derivation hosts (e.g., the regional certificate authority or other existing key derivation host within the region) and a shared secret K2. As described above, the shared secret K2 may be divided into N shares using a shared secret algorithm, where K shares are required to reconstruct K2. In an embodiment, the new key derivation host acquires a copy of the encrypted volume and K1 from a first key derivation host (e.g., the regional certificate authority) and transmits a number of requests (e.g. N) to the other key derivation hosts requesting shares of K2. In response, the key derivation hosts may return an encrypted share of K2.

In various embodiments, the new key derivation hosts submits one or more certificate signing requests (CSRs) to the regional certificate authority. As described above, the CSRs may include cryptographic material generated by the new key derivation host to be used for validating and encrypting information communicated between the new key derivation hosts and other key derivation hosts within the region. The regional certificate authority (or other key derivation host receiving the CSRs) may then validate the CSRs. For example, information included in the CSRs identifying the key derivation host is validated against information included in the whitelist. If the CSRs are invalid an error is returned, for example, if the key derivation host is not included in the whitelist, an error may be returned. In various embodiments, the error triggers an alarm and a notification is sent to an engineer or other personnel.

In step 512, the new key derivation host obtains the encrypted volume, K1, and one or more encrypted shares of K2. Returning the examples above, in response to the CSRs being validated, the key derivation host responds to the request by digitally signing and providing the digitally signed CSRs, providing the encrypted volume, the key derivations host's K1, and the key derivation host's N encrypted shares of K2. The response, in various embodiments, is encrypted using a public key of the new key derivation host included in the CSRs.

In step 514, the new key derivation hosts reconstructs the passphrase. As described above, the passphrase is generated by combining K1 and K2 (e.g., using a key derivation algorithm) and then reconstnicting a master key for the encrypted volume using the passphrase. The master key allows the key derivation host to perform I/O operations on the encrypted volume. In step 516, the key derivation host executes the recovery procedure. The recovery procedure is described in greater detail below in connection with FIG. 6. Note that one or more of the operations performed in steps 502-516 may be performed in various orders and combinations, including in parallel. In numerous variations to the process 700, one or more of the operations in steps 502-516 may be omitted or performed by other systems or services. For example, the whitelisting of key derivation hosts is omitted in embodiments where a whitelist is not used or some other mechanism for tracking and/or approving or validating key derivation hosts is used.

Figure 6:
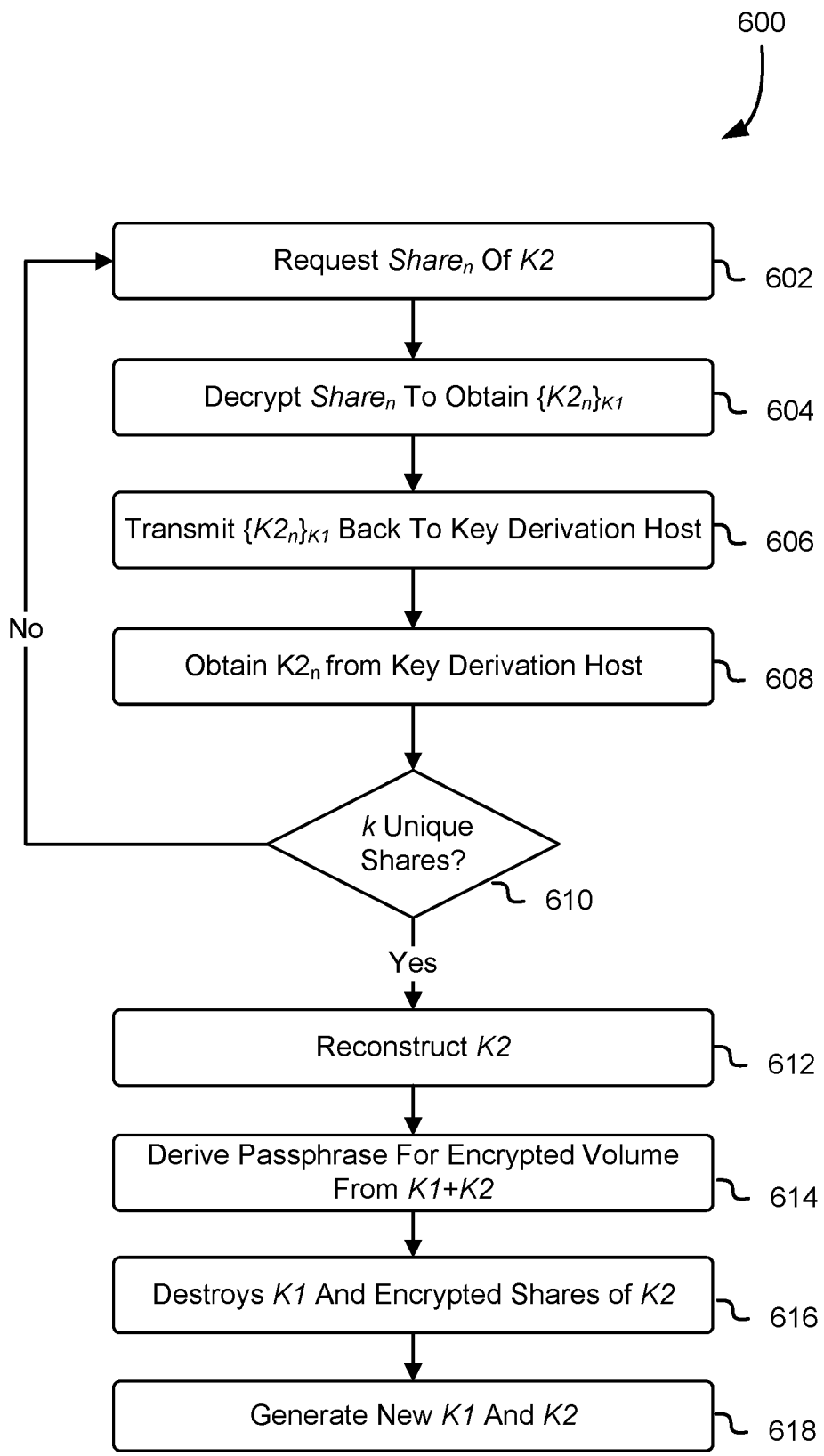
FIG. 6 shows an illustrative example of a process for recovering a key derivation host after a failure state.

FIG. 6 is a block diagram illustrating an example of a process 600 for recovering cryptographic material in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as the key derivation host 316, by multiple computing devices in a distributed system of a computing resource service provider, or by a service provided by a computing resource service provider. The process 600 includes, in step 602, transmitting a request to a key derivation host for a share (share$_n$) of the shared secret K2, where n represents the key derivation host. In response to the request, the key derivation host validates the request and provides the share$_n$ encrypted with the public key of the key derivation host requesting the share of the shared secret K2. In other embodiments, the share$_n$ is encrypted with a symmetric cryptographic key accessible to the key derivation host requesting the share of the shared secret K2.

In step 604, the system executing the process 600 decrypts share$_n$ to obtain the shared secret K2 wrapped in K1 represented as $\{K2\}_{K1}$. As described above, each key derivation host may maintain a cryptographic key or other secret information K1 and combine K1 with K2 to generate the passphrase for the encrypted volume. In step 606, the system executing the process 600 transmits $\{K2\}_{K1}$ back to the key derivation host responsible for generating share$_n$. In response the key derivation host, in various embodiments, decrypts or otherwise unwraps $\{K2\}_{K1}$ with K1 to generate the share of K2 (e.g., K2$_n$).

In step 608, the system executing the process 600 obtains a share of the shared secret K2$_n$. As described above, in accordance with the shared secret algorithm used to generate K2 a number of shares of the shared secret k must be obtained to recreate K2. In step 610, the system executing the process 600 determines if a sufficient number of shares k have been obtained in order to recreate the shared secret K2. If the sufficient number of shares k have not been obtained, the system executing the process 600, returns to step 602 and continues to obtain shares. However, if the sufficient number of shares k have been obtained, the system executing the process 600, continues to step 612 and reconstructs K2. As described in greater detail above, the shared secret K2 may be split into N shares and reconstructed from k of the N shares.

In step 614, the system executing the process 600 derives the passphrase for the encrypted volume from the combination of K1 and K2. Furthermore, the passphrase may be used to access the encrypted volume and enable the key derivation host to perform I/O operations with the encrypted volume. In step 616, the system executing the process 600 destroys K1 and all the encrypted shares of K2 obtained to recreate the shared secret K2. Destruction of the K1 and the encrypted shares of K2 ensures that the sensitive information is not exposed. In step 616, the system executing the process 600 generates a new K1 and K2. In various embodiments, the new K1 and K2 are used to generate a new passphrase for the encrypted volume. Furthermore, in some embodiments, the system executing the process 600 simply generates a new K1 and obtains and encrypted share$_n$ of K2. For example, the shared secret K2 is generated by the regional certificate authority, as described above, and distributed to each of the key derivation hosts. In addition, the shares of K2 may be encrypted prior to distribution.

Note that one or more of the operations performed in steps 602-618 may be performed in various orders and combinations, including in parallel. For example, all of the key derivation hosts in the region may generate the new K1 while waiting for the regional certificate authority to distribute encrypted shares of K2. In numerous variations to the process 600, one or more of the operations in steps 602-618 may be omitted or performed by other systems or services. For example, in embodiments where K2 is not wrapped in K1, step 606 is omitted.

Figure 7:
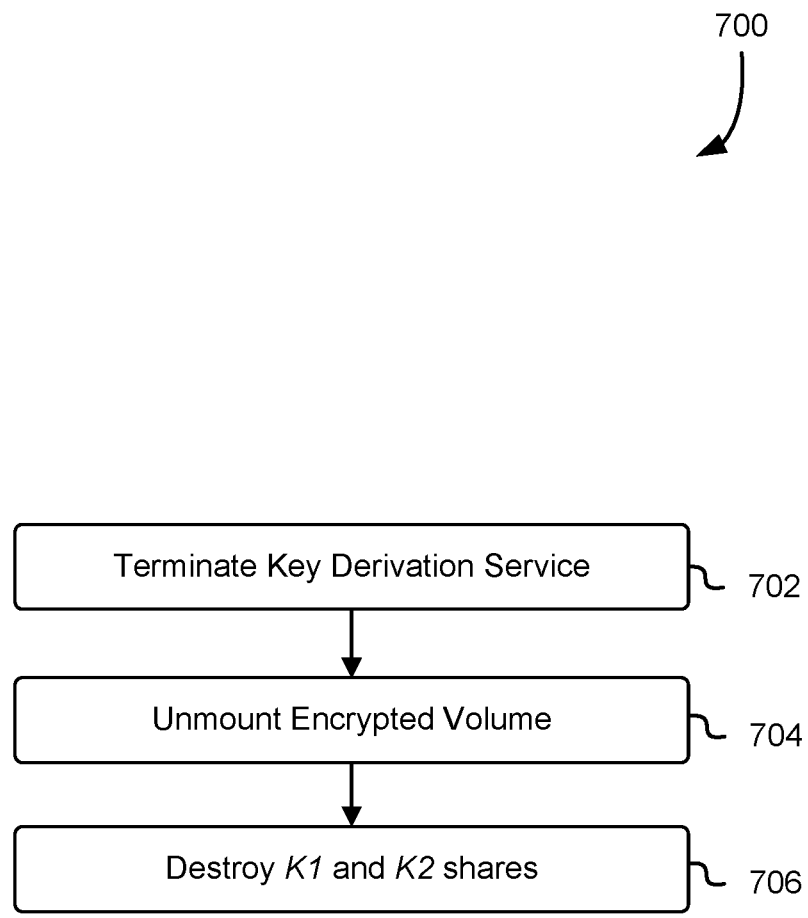
FIG. 7 shows an illustrative example of a process for a response by a key derivation host to a connection attempt during secure operation.

FIG. 7 is a block diagram illustrating an example of a process 700 for securely terminating a key derivation host in response to a connection to the key derivation host in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 100 described in conjunction with FIG. 1, such as the key derivation host 316, by multiple computing devices in a distributed system of a computing resource service provider, or by a service provided by a computing resource service provider. The process 700 includes terminating the key derivation service. As described above, in various embodiments, the key derivation hosts may include a physical computer system or virtual computer system executing source code or other instructions that perform the operations described in the present disclosure. As a result, terminating the key derivation service may include terminating an application and/or process executing source code or other instructions.

In step 704, the system executing the process 700 unmounts the encrypted volume. In various embodiments, the encrypted volume is provided by a storage service of a computing resource service provider. In step 706, the system executing the process 700 destroys K1 and any shares of K2. Destruction of the cryptographic material K1 and K2 (and/or shares of K2) may be performed by deleting or otherwise removing the data from memory and ensuring that the data has not been written to disk (e.g., in a swap file). In various embodiments, the key derivation hosts are prevent from maintaining any of K1, shares of K2, or K2 outside of memory (e.g., random access memory). Note that one or more of the operations performed in steps 702-706 may be performed in various orders and combinations, including in parallel. In numerous variations to the process 700, one or more of the operations in steps 702-706 may be omitted or performed by other systems or services.

As one skilled in the art will appreciate in light of this disclosure, certain embodiments may be capable of achieving certain advantages, including some or all of the following: increasing security in distributed computer systems, reducing latency and increasing availability by at least maintaining cryptographic material on disk, and enabling efficient management of cryptographic material such as key rotation, validation, and creation.

Figure 8:
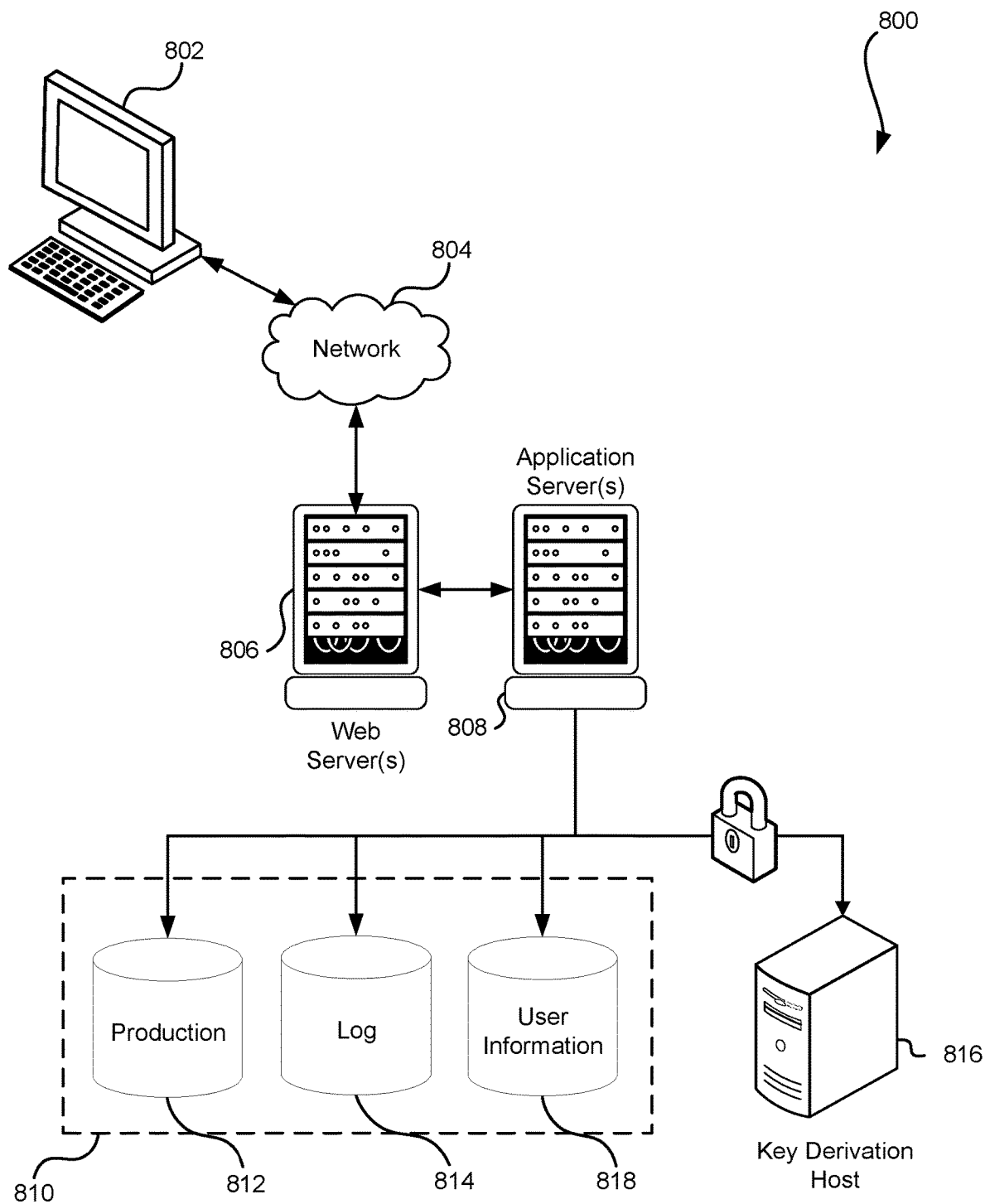
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 818, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

As described above, a key derivation host 816 may perform encryption operations on behalf of the application server 808. For example, the key derivation host 816 digitally signs data on behalf of the application server 808. In another example, the key derivation host 816 encrypts data prior to storage on behalf of the application server 808.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media. and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A,C}, {B,C}, {A,B,C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A,B}, {A,C}, {B,C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
submitting a certificate signing request for a regional certificate authority associated with a region, where the region includes a plurality of key derivation hosts, to a global certificate authority for signing;
updating an encrypted volume for use by the plurality of key derivation hosts by at least:
generating a first cryptographic key and a shared secret, where the first cryptographic key is based at least in part on a randomly or pseudorandomly generated value;
generating a passphrase to enable the plurality of key derivation hosts to perform operations with the encrypted volume by at least cryptographically combining the first cryptographic key and the shared secret;
splitting the shared secret into a plurality of shares, where a first number of the plurality of shares is greater than a second number of the plurality of shares and the second number of the plurality of shares is required to reconstruct the shared secret;
adding the plurality of key derivation hosts to a list indicating key derivation hosts of the plurality of key derivation hosts that are authorized to transmit shares of the plurality of shares; and
distributing the plurality of shares to the plurality of key derivation hosts, where a first share of the plurality of shares is cryptographically wrapped in the first cryptographic key;
causing copies of the encrypted volume to be provided to the plurality of key derivation hosts;
unmounting the encrypted volume; and
destroying the first cryptographic key and at least one share of the plurality of shares.

2. The computer-implemented method of claim 1, wherein the computer-implemented method further comprises preventing access to the plurality of key derivation hosts.

3. The computer-implemented method of claim 1, wherein the second number of the plurality of shares is less than a total number of shares of the plurality of shares, where less than the second number of shares of the plurality of shares is insufficient to reconstruct the shared secret.

4. The computer-implemented method of claim 1, wherein the computer-implemented method further comprises storing a backup of the encrypted volume in a storage service of a computing resource service provider.

5. A system, comprising:
one or more processors; and memory that stores computer-executable instructions that are executable by the one or more processors to cause the system to:
  obtain an indication that a host has been instantiated;
  update a list of one or more approved hosts to include information indicating the host;
  associate the host with a logical grouping including at least one other host;
  obtain from the host a request for at least an encrypted volume;
  provide the host with access to the encrypted volume, a first cryptographic key, and at least one share of a second cryptographic key, wherein:
    the first cryptographic key is:
      insufficient to decrypt the encrypted volume but being combinable with at least the second cryptographic key to obtain a third cryptographic key to decrypt the encrypted volume and;
      based at least in part on a randomly or pseudo-randomly generated value; and
    the at least one share is from a plurality of shares of the second cryptographic key, a subset of which is sufficient to construct the second cryptographic key;
  cause the encrypted volume to be unmounted; and
  cause the first cryptographic key and at least one share of the second cryptographic key to be destroyed.

6. The system of claim 5, wherein the second cryptographic key divided into a first number of shares is divided based at least in part on a secret sharing algorithm.

7. The system of claim 5, wherein the memory further includes instructions that, as a result of being executed by the one or more processors, cause the system to encrypt the at least one share of the second cryptographic key with a public key associated with the host.

8. The system of claim 5, wherein the memory further includes instructions that, as a result of being executed by the one or more processors, cause the system to disable Secure Shell (SSH) on the host.

9. The system of claim 5, wherein the memory further includes instructions that, as a result of being executed by the one or more processors, cause the system to:
  delete the first cryptographic key and the second cryptographic key;
  generate a third cryptographic key and a fourth cryptographic key;
  split the fourth cryptographic key into a plurality of shares;
  encrypt a share of the plurality of shares to generate an encrypted share; and
  provide the encrypted share to the host.

10. The system of claim 5, wherein the memory further includes instructions that, as a result of being executed by the one or more processors, cause the system to encrypt the at least one share of the second cryptographic key with the first cryptographic key.

11. The system of claim 10, wherein the memory further includes instructions that, as a result of being executed by the one or more processors, cause the system to:
  obtaining the at least one share of the second cryptographic key encrypted with the first cryptographic key; and
  decrypting the at least one share of the second cryptographic key to generate a decrypted share.

12. The system of claim 5, wherein the memory further includes instructions that, as a result of being executed by the one or more processors, cause the system to detect a connection to the system.

13. A non-transitory computer-readable storage medium storing thereon executable instructions that, as a result of being executed by one or more processors of a computer system, cause the computer system to at least:
  provide a certificate signing request to a certificate authority;
  in response to obtaining information indicating a certificate included in the certificate signing request has been digitally signed, provision an encrypted volume by at least:
    generating first cryptographic material and second cryptographic material, where:
      neither the first cryptographic material nor the second cryptographic material is sufficient to allow decryption of the encrypted volume but the first cryptographic material is combinable with at least the second cryptographic material to allow decryption of the encrypted volume; and
      the first cryptographic material is based at least in part on a randomly or pseudorandomly generated value;
    generating a plurality of shares of the second cryptographic material, wherein less than all of the plurality of shares is sufficient to construct the second cryptographic material but individual shares of the plurality shares are individually insufficient to construct the second cryptographic material; and
    distributing the plurality of shares of the second cryptographic material to respective hosts of a group of hosts;
  unmount the encrypted volume; and
  destroy the first cryptographic material and at least one share of the plurality of shares.

14. The non-transitory computer-readable storage medium of claim 13, wherein the instructions further comprise instructions that, as a result of being executed by the one or more processors, cause the computer system to encrypt a share of the plurality of shares of the second cryptographic material with the first cryptographic material prior to distributing the share to a host of the group of hosts.

15. The non-transitory computer-readable storage medium of claim 13, wherein the instructions further comprise instructions that, as a result of being executed by the one or more processors, cause the computer system to encrypt a share of the plurality of shares of the second cryptographic material with third cryptographic material prior to distributing the share to a host of the group of hosts.

16. The non-transitory computer-readable storage medium of claim 13, wherein the instructions further comprise instructions that, as a result of being executed by the one or more processors, cause the computer system to encrypt a share of the plurality of shares of the second cryptographic material with the first cryptographic material and third cryptographic material prior to distributing the share to a host of the group of hosts.

17. The non-transitory computer-readable storage medium of claim 13, wherein the instructions that cause the computer system to generate the plurality of shares further include instructions that cause the computer system to generate the plurality of shares in accordance with Shamir's Secret Sharing algorithm.

18. The non-transitory computer-readable storage medium of claim 13, wherein the respective hosts are associated with a region.

19. The non-transitory computer-readable storage medium of claim 13, wherein the instructions that cause the computer system to distribute the plurality of shares of the second cryptographic material to the group of hosts further include instructions that cause the computer system to encrypt a share of the plurality of shares using a public key associated with a host of the group of hosts, where the host is an intended recipient of the share.

20. The non-transitory computer-readable storage medium of claim 13, wherein the instructions further comprise instructions that, as a result of being executed by the one or more processors, cause the computer system to modify a number of the plurality of shares and a number of shares from the plurality of shares sufficient to construct the second cryptographic material in response to modifying a number of hosts of the group of hosts.

* * * * *